(12) United States Patent
Hoshi (10) Patent No.: US 7,956,896 B2
(45) Date of Patent: Jun. 7, 2011

(54) IMAGE-TAKING APPARATUS CAPABLE OF PREVENTING AN OBJECT POINT FROM MOVING ORTHOGONAL TO THE OPTICAL AXIS DURING MAGNIFICATION

(75) Inventor: Koji Hoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 12/207,847

(22) Filed: Sep. 10, 2008

(65) Prior Publication Data

US 2009/0009631 A1    Jan. 8, 2009

Related U.S. Application Data

(62) Division of application No. 10/889,292, filed on Jul. 12, 2004, now Pat. No. 7,440,007.

(30) Foreign Application Priority Data

Jul. 28, 2003   (JP) ................. 2003-281280

(51) Int. Cl.
*H04N 5/228*   (2006.01)
*H04N 5/262*   (2006.01)
*H04N 9/64*    (2006.01)

(52) U.S. Cl. ............... 348/208.11; 348/240.3; 348/251

(58) Field of Classification Search .......... 348/169–171, 348/187, 208.7, 208.11, 208.14, 251, 240.99, 348/240.3; 382/274, 275; 396/55
See application file for complete search history.

(56) References Cited

U.S. PATENT DOCUMENTS

| 6,630,950 | B1 | 10/2003 | Ohkawara et al. |
| 7,190,845 | B2 | 3/2007 | Iida |
| 2003/0234879 | A1 | 12/2003 | Whitman et al. |
| 2004/0257454 | A1 | 12/2004 | Pinto et al. |

FOREIGN PATENT DOCUMENTS

| EP | 942309 A2 | 9/1999 |
| GB | 2258968 A | 2/1993 |
| JP | 2000-134528 | 5/2000 |

*Primary Examiner* — Timothy J Henn
(74) *Attorney, Agent, or Firm* — Canon USA Inc. IP Division (57) ABSTRACT

An image-taking apparatus is disclosed which is capable of adjusting a positional displacement of an image-taking optical system and an image-pickup element even in a state in which they are fixed. The image-taking apparatus includes the image-taking optical system including an offset lens unit movable in a direction orthogonal to an optical axis, the image-pickup element and a memory which stores adjustment data. The adjustment data is data on a movement amount of the offset lens unit to make light amounts in peripheral parts on the image-pickup element substantially homogeneous in a case where an object has a surface with approximately homogeneous luminance.

5 Claims, 10 Drawing Sheets

IMAGE-TAKING APPARATUS CAPABLE OF PREVENTING AN OBJECT POINT FROM MOVING ORTHOGONAL TO THE OPTICAL AXIS DURING MAGNIFICATION

This is a divisional of prior application Ser. No. 10/889,292, filed Jul. 12, 2004 now U.S. Pat. No. 7,440,007 to which priority under 35 U.S.C. §120 is claimed. This application also claims priority from Japanese Patent Application No. 2003-28180 filed on Jul. 28, 2003, the entire contents of which are incorporated herein by reference.

BACKGROUND OF THE INVENTION

1. Field of the Invention

The present invention relates to an image-taking apparatus using an image-pickup element such as a video camera or a digital camera.

2. Description of the Related Art

An image-taking apparatus such as a video camera or a digital still camera has an image-taking lens system and an image-pickup element used therein. There are many cases, however, where an optical axis of the image-taking lens system is slightly displaced from a center of the image-pickup element due to a manufacturing error and the like.

In general, a light amount is reduced as it gets away from an optical axis on an image surface. Therefore, if the center of the image-pickup element is displaced from the optical axis of the image-taking lens system, there arises unbalance as to the light amount of four peripheral parts (in the vicinity of four corner parts) on the image-pickup element.

In the case of using an image-taking lens capable of variation of magnification, if the center of the image-pickup element is slightly displaced from the optical axis of the image-taking lens system, there occurs a phenomenon of so-called "zoom center displacement" in which an object image-formed at the center of the image-pickup element shifts due to the variation of magnification.

And as the image-pickup element becomes higher-pixelated and miniaturized in recent years, the slight displacement of the center of the image-pickup element from the optical axis of the image-taking lens system significantly influences a quality of a taken image.

Japanese Patent Laid-Open No. 2000-134528 discloses a method which resolves the displacement of the image-pickup element from the optical axis of the image-taking lens system by adjusting a position of the image-pickup element.

In the case of the adjustment method disclosed in Japanese Patent Laid-Open No. 2000-134528, however, the entire image-pickup element unit including a substrate which drives the image-pickup element must be moved in reality. Therefore, it is necessary to provide a space to move the image-pickup element unit in the image-taking apparatus, and so there is a problem that the image-taking apparatus becomes larger-size.

In addition, the image-pickup element is fixed (attached) on the image-taking lens system by adjusting its position, and so positioning work is cumbersome.

SUMMARY OF THE INVENTION

An object of the present invention is to provide an image-taking apparatus and an optical adjustment method therefore capable of adjusting a position displacement between an image-taking optical system and an image-pickup element even in a state in which they are fixed, that is, a state in which assembly is completed.

As one aspect to attain the object, an image-taking apparatus of the present invention comprises an image-taking optical system including an offset lens unit movable in a direction orthogonal to an optical axis of the image-taking optical system, an image-pickup element which photoelectrically converts an image of an object formed by the image-taking optical system, and a memory which stores adjustment data. The adjustment data is data on a moving amount of the offset lens unit to make light amounts in peripheral parts on the image-pickup element substantially homogeneous in a case where the object has a surface with approximately homogeneous luminance.

As another aspect, the image-taking apparatus of the present invention comprises an image-taking optical system including an offset lens unit movable in a direction orthogonal to an optical axis of the image-taking optical system and capable of variation of magnification, an image-pickup element which photoelectrically converts an image of an object formed by the image-taking optical system, and a memory which stores adjustment data. The adjustment data is data on a moving amount of the offset lens unit to prevent substantially an object point image-formed at a center on the image-pickup element by the image-taking optical system from moving in a direction orthogonal to the optical axis during the variation of magnification.

As a further aspect, an optical adjustment method of the present invention is an optical adjustment method for an image-taking apparatus comprising an image-taking optical system including an offset lens unit movable in a direction orthogonal to an optical axis of the image-taking optical system, and an image-pickup element which photoelectrically converts an image of an object formed by the image-taking optical system. And the method comprises a step to set the image-taking apparatus at a predetermined position with respect to a surface with approximately homogeneous luminance as the object, and a step to adjust the position of the offset lens unit in the direction orthogonal to the optical axis so that light amounts from the surface become substantially homogeneous in peripheral parts on the image-pickup element.

As a still further aspect, an optical adjustment method of the present invention is an optical adjustment method for an image-taking apparatus comprising an image-taking optical system including an offset lens unit movable in a direction orthogonal to an optical axis of the image-taking optical system and capable of variation of magnification, and an image-pickup element which photoelectrically converts an image of an object formed by the image-taking optical system. And the method comprises a step to set the image-taking apparatus at a predetermined position with respect to the object, and a step to adjust the position of the offset lens unit in the direction orthogonal to the optical axis in order to prevent substantially an object point image-formed at a center on the image-pickup element by the image-taking optical system from moving in a direction orthogonal to the optical axis during the variation of magnification.

Characteristics of the image-taking apparatus of the present invention and the optical adjustment method therefore will be clarified by the following description of concrete embodiments by referring to the drawings.

DETAILED DESCRIPTION OF THE PREFERRED EMBODIMENTS

Hereafter, embodiments of the present invention will be described by referring to the drawings.

Embodiment 1

Figure 1:
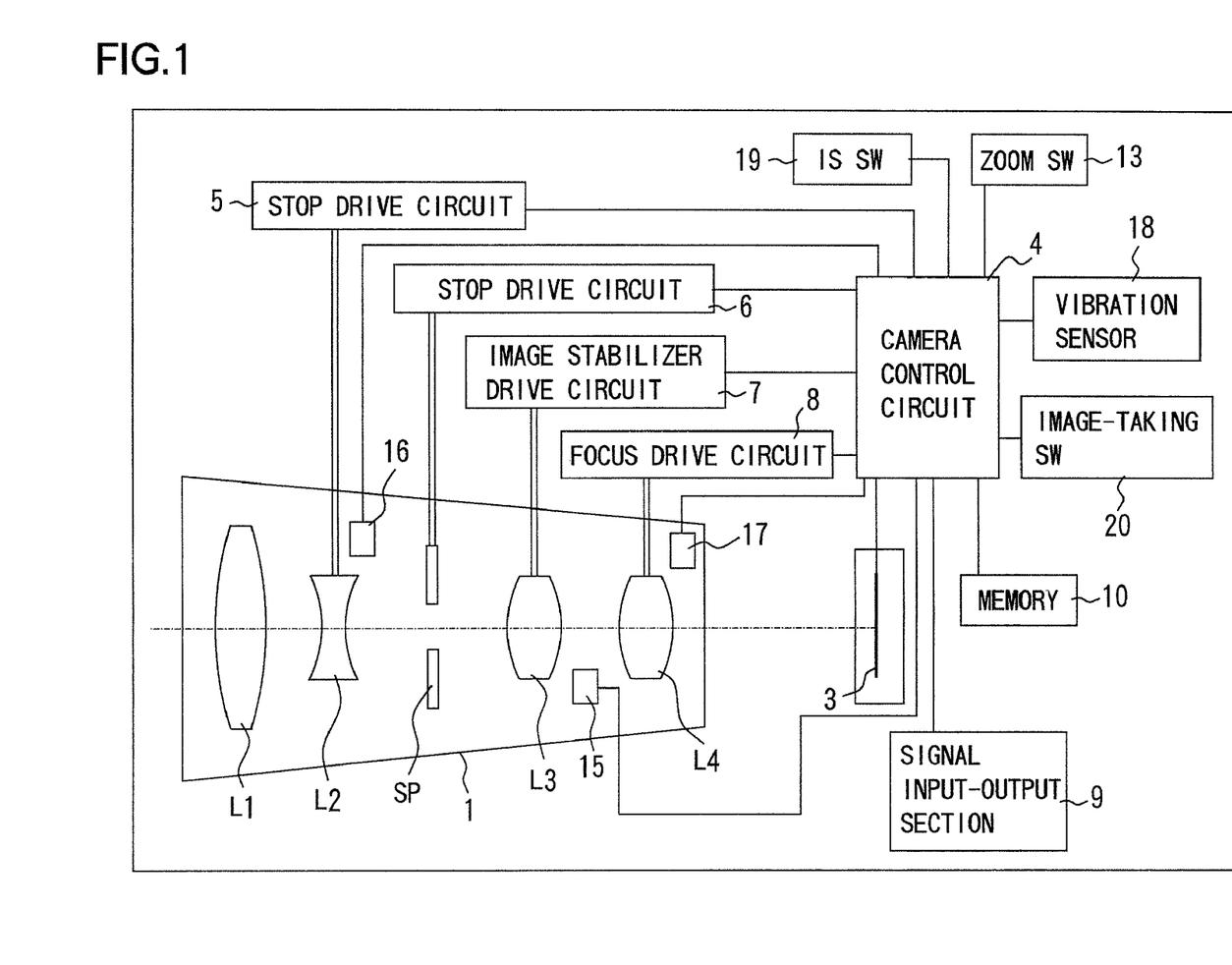
FIG. 1 is a block diagram showing a structure of a video camera which is Embodiment 1 of the present invention.

FIG. 1 is a block diagram showing a structure of a video camera (image-taking apparatus) which is Embodiment 1 of the present invention. In FIG. 1, reference numeral 1 denotes a zoom image-taking lens system (image-taking optical system capable of variation of magnification). The image-taking lens system 1 is comprised of, from an object side (left side in the drawing) to an image surface side, a positive fixed lens unit L1, a negative variator lens unit L2, a stop unit SP, a positive blurring correcting lens unit (hereafter, merely referred to as a correcting lens unit) L3 and a positive compensator and focus lens unit (hereafter, merely referred to as a focus lens unit) L4.

The variator lens unit L2 moves in an optical axis direction of the image-taking lens unit 1 to perform variation of magnification, and the focus lens unit L4 moves in the optical axis direction to correct image surface movement in conjunction with the variation of magnification and perform focusing. The correcting lens unit L3 shifts in a direction orthogonal to the optical axis so as to correct an image blurring (image deflection) on an image surface, which occurs with a camera shake due to a shake of a user's hand or the like. As will be described later, the correcting lens unit L3 is also used as an offset lens unit which corrects a displacement between the optical axis of an image-taking optical system 1 and a center of an image-pickup element.

Furthermore, the stop unit SP is placed between the variator lens unit L2 and the correcting lens unit L3.

Reference numeral 3 denotes a solid-state image-pickup element such as a CCD sensor or a CMOS sensor, which photoelectrically converts an object image formed by the image-taking lens system 1. Reference numeral 4 denotes a camera control circuit (CPU, MPU or the like) as a controller which controls the entire operation of this camera, and it also contains an image processing circuit (not shown) which performs various processes to an output signal from the image-pickup element 3 and generates an image signal to record it on an unshown recording medium (a semiconductor memory, a magnetic disk, an optical disk or the like).

Reference numeral 5 denotes a zoom drive circuit which drives the variator lens unit L2 according to a command signal from the camera control circuit 4. The zoom drive circuit 5 includes a zoom motor which is a drive source although not shown. Reference numeral 16 denotes a zoom position sensor to detect a position (zoom position) of the variator lens unit L2, and it is comprised of a slit plate rotating in conjunction with rotation of the zoom motor and a photo-interrupter which detects switching between light shielding and transmission by the slit plate and outputs a pulse signal. A photo-reflector or a magnetic sensor may be used as the zoom position sensor.

In the case of a structure using a stepping motor as the zoom motor, it is also possible to provide a light shielding blade (not shown) on a lens frame holding the variator lens unit L2 and constitute the zoom position sensor 16 with the photo-interrupter as a reset sensor so as to detect the switching between the light shielding and transmission by the light shielding blade and detect the zoom position by detecting the reset position and counting the driving pulse of the stepping motor from this reset position.

Reference numeral 6 denotes a stop drive circuit which drives the stop unit SP according to a command signal from the camera control circuit 4. The stop drive circuit 6 includes a stop motor which is the drive source although not shown (a mechanical connection is indicated by a double line in the drawing, which is the same hereafter).

Reference numeral 7 denotes an image stabilizer drive circuit which drives the correcting lens unit L3 according to a command signal from the camera control circuit 4. The image stabilizer drive circuit 7 includes an actuator (comprised of a coil, a magnet) as a drive source although not shown.

Reference numeral 15 denotes a shift position sensor which detects positions of the correcting lens unit L3 in two directions orthogonal to the optical axis and orthogonal to each other, where a magnetic sensor or an optical sensor is used for instance.

Reference numeral 18 denotes a vibration sensor which outputs a signal according to the camera shake, where a vibration gyro or an acceleration sensor is used. The signal from the vibration sensor 18 is input to the camera control circuit 4. The camera control circuit 4 calculates a drive direction and a drive amount of the correcting lens unit L3 required to correct an image blurring on the image-pickup element 3 based on the signal from the vibration sensor 18 so as to drive the correcting lens unit L3 via the image stabilizer drive circuit 7 according to the calculation results. Thus, the image blurring on the image-pickup element 3 due to the camera shake is suppressed.

Reference numeral 19 denotes an image stabilizing (IS) switch. If it is turned on, the above-mentioned image blurring correcting (image stabilizing) function will be on. And if it is turned off, the function will be off (the image blurring correcting function may be constantly on in the case where an image-taking mode is a full auto mode).

Reference numeral 8 denotes a focus drive circuit which drives the focus lens unit L4 according to a command signal from the camera control circuit 4. The focus drive circuit 8 includes a focus motor as a drive source although not shown.

In the case of using the stepping motor as a focus motor, the light shielding blade (not shown) is provided on the lens frame holding the focus lens unit L4 and the focus position sensor 17 is constituted with the photo-interrupter as a reset sensor so as to detect the reset position by detecting the switching between the light shielding and transmission by the light shielding blade and detect the focus position by counting the driving pulse of the stepping motor from this reset position. It is also possible, as the structure to detect the focus position, to provide a magnetic scale and an optical scale on the lens frame holding the focus lens unit L4 and constitute the focus position sensor 17 with the magnetic sensor and the optical sensor so as to directly detect the position of the focus lens unit L4.

Reference numeral 9 denotes a signal input-output section (connector or the like). On peripheral light amount adjustment described later, the camera control circuit 4 is electrically connected to an adjusting apparatus provided separately from the camera via the signal input-output section 9 and communicates signals with the adjusting apparatus so as to adjust the peripheral light amounts by driving the correcting lens unit L3 via the image stabilizer drive circuit 7 based on the communicated contents.

Reference numeral 10 denotes a memory such as an EEPROM which stores offset position data (adjustment data) described later as an electrical signal. The memory 10 also stores position data (electronic cam data or zoom tracking data) of the focus lens unit L4 for the sake of keeping the image surface at a predetermined position according to the position of the variator lens unit L2.

Reference numeral 13 denotes a zoom switch operated by a user. If the zoom switch 13 is operated on a telephoto side or a wide-angle side, the camera control circuit 4 drives the zoom motor 15 via the zoom drive circuit 5 in the direction according to the signal indicating the direction from the zoom switch 13. Thus, the variator lens unit L2 moves in the direction according to an operating direction of the zoom switch 13 so as to perform the variation of magnification. In this case, the camera control circuit 4 detects the position of the variator lens unit L2 based on the signal from the zoom position sensor 16, and reads the position of the focus lens unit L4 according to the detected position from the electronic cam data in the memory 10, and then moves the focus lens unit L4 to that position via the focus drive circuit 8.

The camera control circuit 4 extracts a high-frequency component from the output signal (or the image signal) from the image-pickup element 3, and moves the focus lens unit L4 to the position at which a peak value of the high-frequency component is maximum so as to perform auto focus control.

Reference numeral 20 denotes an image-taking switch operated by the user for the sake of starting and stopping image-taking.

Figure 2:
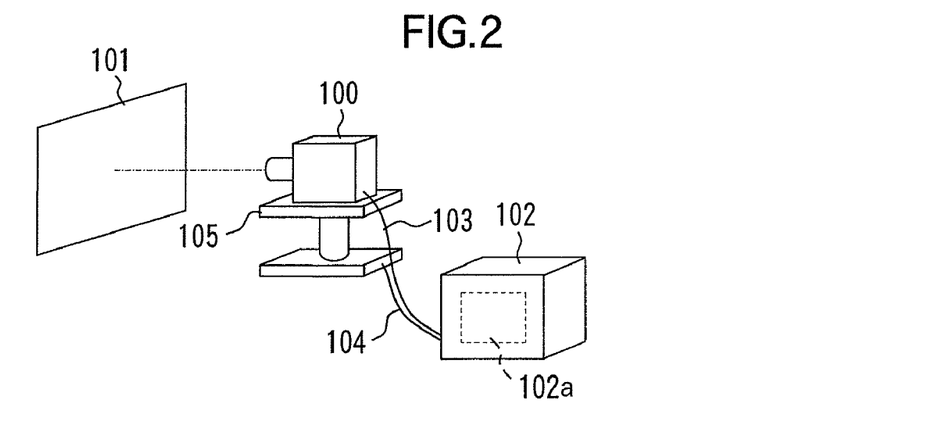
FIG. 2 is a diagram describing placement of a camera and an adjusting apparatus in Embodiment 1.

Next, a description will be given as to a peripheral light amount adjustment method for the camera with the adjusting apparatus. FIG. 2 shows an appearance on a peripheral light amount adjustment for the camera.

Reference numeral 100 denotes the camera described in FIG. 1 which has the peripheral light amount adjustment performed thereon and has finished final assembly (having the image-pickup element 3 fixed to the image-taking lens system 1). Reference numeral 101 denotes a of homogeneous luminance surface (object) with substantially homogeneous luminance such as a light box. Reference numeral 105 denotes a stage supporting the camera 100, which adjusts vertical and horizontal positions of the camera 100 against the homogeneous luminance surface 101.

Reference numeral 102 denotes the adjusting apparatus, which is connected to the signal input-output section 9 of the camera 100 via a cable 103. The adjusting apparatus 102 is comprised of a personal computer or a dedicated computer, and communicates signals necessary for the peripheral light amount adjustment with the camera 100. And the adjusting apparatus 102 is connected to the stage 105 via a cable 104, and performs drive control of the stage 105.

Figure 3:
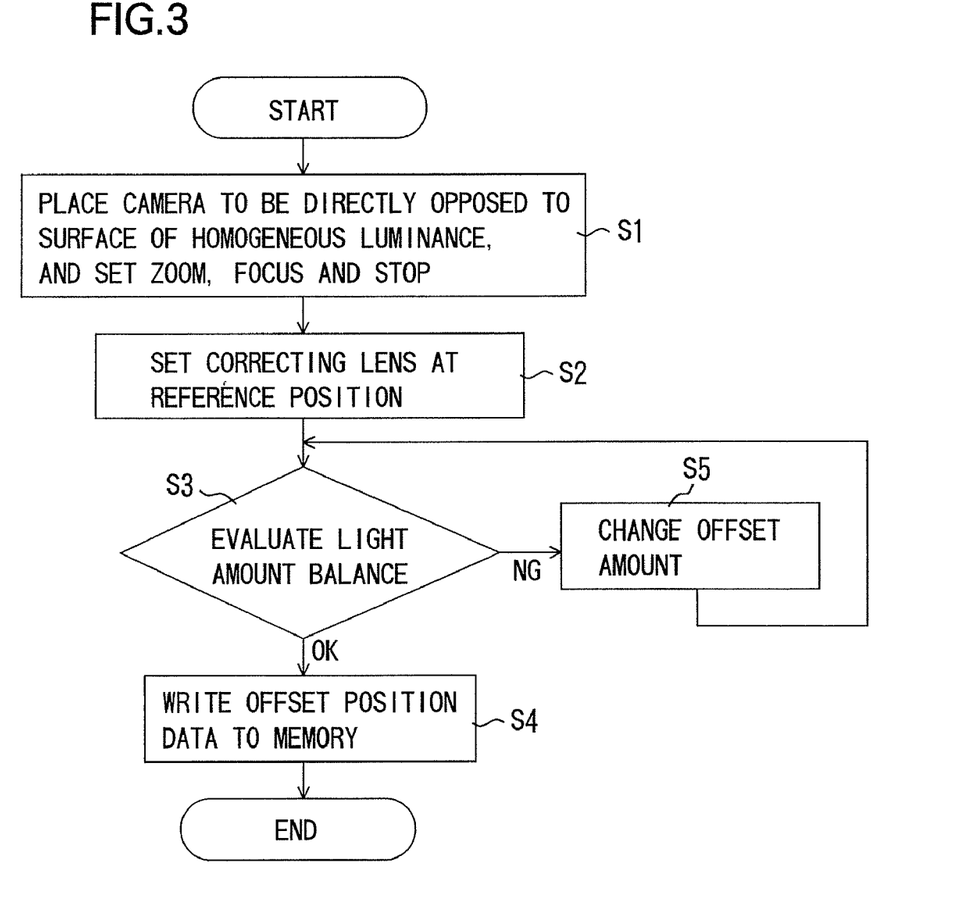
FIG. 3 is a flowchart showing peripheral light amount adjustment control by the adjusting apparatus in Embodiment 1.

Next, an overview of the peripheral light amount adjustment will be described according to a flowchart in FIG. 3. This flowchart is executed by a controller (CPU or the like: hereafter, referred to as an adjusting controller 102a) in the adjusting apparatus 102.

First, in Step (abbreviated as S in the drawing) 1, the adjusting controller 102a drives the stage 105 to place the camera 100 to be directly opposed to approximately the center of the homogeneous luminance surface 101. And the adjusting controller 102a sends to the camera control circuit 4 a command to set the variator lens unit L2, the focus lens unit L4 and the stop unit SP in a predetermined adjusting state (concretely described later). According to this command, the camera control circuit 4 sets the variator lens unit L2, the focus lens unit L4 and the stop unit SP in the predetermined adjusting state via the zoom drive circuit 5, the focus drive circuit 8 and the stop drive circuit 6.

Next, in Step 2, the adjusting controller 102a sends to the camera control circuit 4 a command to set the correcting lens unit L3 to a reference position at the center (on the optical axis of the image-taking lens system 1) or the vicinity of the center (in a range with no substantial change of an image position on the image surface) of a range of movement for correcting the image blurring. The camera control circuit 4 sets the correcting lens unit L3 to the reference position via the image stabilizer drive circuit 7 according to the command.

Next, in Step 3, the adjusting controller 102a takes in the output signal from the image-pickup element 3 via the camera control circuit 4 so as to perform balance evaluation (described in detail later) of the peripheral light amounts on the image-pickup element 3. And it moves on to Step 4 if determined that the balance of the peripheral light amounts is in a predetermined range and is good, and moves on to Step 5 if determined that the balance is out of the predetermined range and is no good.

In Step 5, the adjusting controller 102a sends to the camera control circuit 4 a command to move the correcting lens unit L3 in the direction to improve the balance (to be in the predetermined range) by a predetermined offset amount based on the result of the balance evaluation. On receiving this command, the camera control circuit 4 moves the correcting lens unit L3 in the direction designated by the command by the predetermined offset amount via the image stabilizer drive circuit 7.

Thus, Step 5 is repeatedly executed until the balance of the light amounts is determined to be good in Step 3. If the balance is determined to be good in Step 3, the adjusting controller 102a sends to the camera control circuit 4 a command to store the offset position data (adjustment data indicating a total offset amount, that is, a movement amount from the reference position) in the direction orthogonal to the optical axis of the correcting lens unit L3. On receiving this command, the camera control circuit 4 detects the position of the correcting lens unit L3 against the reference position, that is, the offset position data at the time based on an output from the shift position sensor 15 so as to write it to the memory 10. And the process according to this flowchart is finished.

Figure 4:
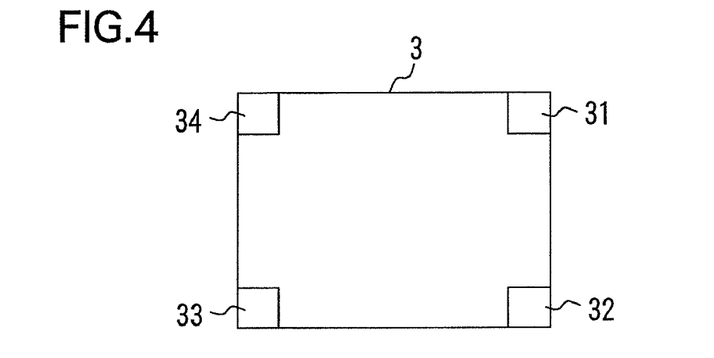
FIG. 4 is a diagram describing light amount balance evaluation in peripheral parts of an image-pickup element.

Next, the balance evaluation of the peripheral light amounts will be described by using FIG. 4. In the balance evaluation according to this embodiment, the adjusting controller 102a of the adjusting apparatus 102 takes in the output signals from four corner parts (areas including a plurality of pixels) 31, 32, 33 and 34 which are the peripheral parts of the entire image-pickup surface of the image-pickup element 3, and compares each average luminance of the output signals or degrees of shadiness thereof in the four corner parts. And if a difference in the average luminance or the degree of shadiness among the four corner parts 31 to 34 is in the predetermined range to be regarded as having no substantial difference, the balance of the light amounts is determined to be good. And if out of the predetermined range, the balance is determined to be no good.

In the case where the balance of the light amounts is determined to be no good, the following is approximately the amount by which the correcting lens unit L3 should be moved in the direction orthogonal to the optical axis in order to make the balance good, when a paraxial lateral magnification of the correcting lens unit L3 is βi, the paraxial lateral magnification of the lens system (the focus lens unit L4 in this embodiment) placed further on the image surface side than the correcting lens unit L3 is βr, and an amount of displacement of the center of the image-pickup element 3 against the optical axis of the image-taking lens system 1 is D at the time.

$$D/\{(1-\beta i)\times\beta r\}$$

On adjusting the peripheral light amount in this embodiment, a true value of the amount of displacement D is not known. Therefore, the correcting lens unit L3 is moved, by the amount (predetermined amount) obtained by assigning the value of D which increases step by step to an expected maximum amount of displacement to the above expression, in the direction of the corner parts in which the average luminance is low or the degree of shadiness is high when seen from the optical axis of the image-taking lens system 1 (Step 5 in FIG. 3) so as to finally implement a state capable of obtaining a good light amount balance.

According to this embodiment, the position of the correcting lens unit L3 in the case where the light amount balance is determined to be good is detected by the shift position sensor 15 and is stored in the memory 10. It is also possible, however, to calculate and store a total offset amount from the reference position of the correcting lens unit L3 in the adjusting controller 102a or the camera control circuit 4, and then store it in the memory 10.

The following shows a numerical example corresponding to this embodiment. The unbalance of the peripheral light amount due to the displacement of the position of the image-pickup element 3 prominently appears on a small aperture of the stop unit SP on the wide-angle side. Therefore, the peripheral light amount adjustment control shown in FIG. 3 is exerted in the state of a focal length=5.35 mm and a stop value F8. The distance between the camera 100 and the homogeneous luminance surface 101 is several tens of cm to 1 m or so, and the homogeneous luminance surface 101 is approximately in focus (not necessary to be strictly in focus).

Figure 5A:
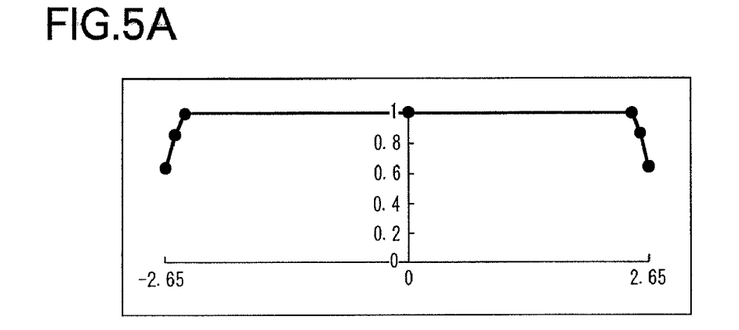
FIGS. 5A to 5C are diagrams describing a light amount balance adjustment in the peripheral parts.
Figure 5B:
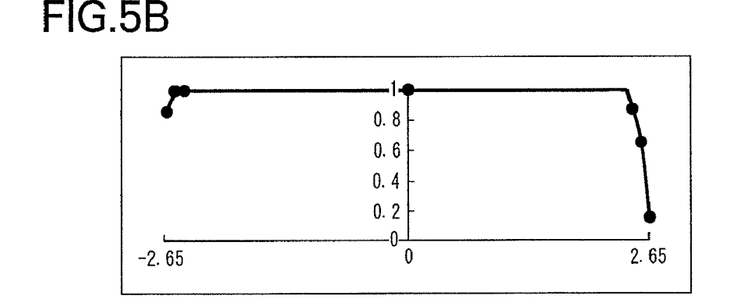
Figure 5C:
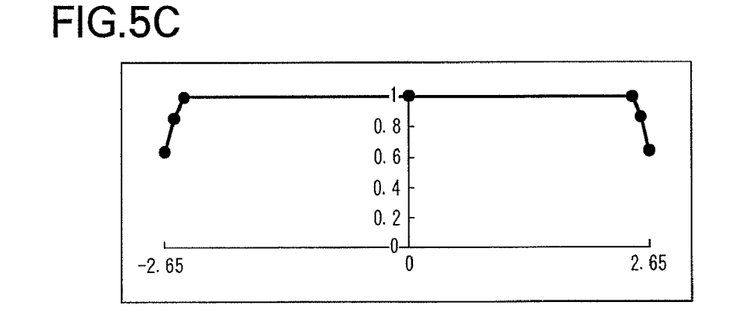

FIGS. 5A to 5C show the appearance wherein, in the camera of Numerical Example 1 shown in Table 1 below, the light amount balance is improved by the peripheral light amount adjustment when the center of the image-pickup element 3 is displaced from the optical axis of the image-taking lens system 1.

FIGS. 5A, 5B and 5C show light amount ratio distribution graphs on the image-pickup element 3 in the state of f=5.35 mm and F8, where a horizontal axis indicates the position of the image-pickup element 3 on a diagonal section (a unit is mm) and a vertical axis indicates a luminance ratio to the luminance at the center of the image-pickup element 3 (which is 1).

FIG. 5A shows the case of no displacement of the center of the image-pickup element 3 from the optical axis. FIG. 5B shows the case where the center of the image-pickup element 3 is diagonally displaced from the optical axis by 0.1 mm. And FIG. 5C shows the case where the center of the image-pickup element 3 is diagonally displaced from the optical axis by 0.1 mm and the correcting lens unit L3 is moved in the direction orthogonal to the optical axis by 0.11 mm.

In FIG. 5A, the light amounts of the two corner parts diagonally positioned against the light amount at the center location are mutually reduced to the same degree, and so the graph is symmetrical.

As opposed to this, in FIG. 5B, the light amount of one (the corner part located further in the direction of displacement of the position of the image-pickup element 3) of the two corner parts diagonally positioned against the light amount at the center location is significantly less than the light amount of the other, and so the graph is left-right asymmetrical.

In FIG. 5C, however, the correcting lens unit L3 is shifted (offset) to the corner part side at which the light amount was reduced in FIG. 5B so that the light amount balance is improved and the graph is symmetrical as with FIG. 5A.

Figure 11:
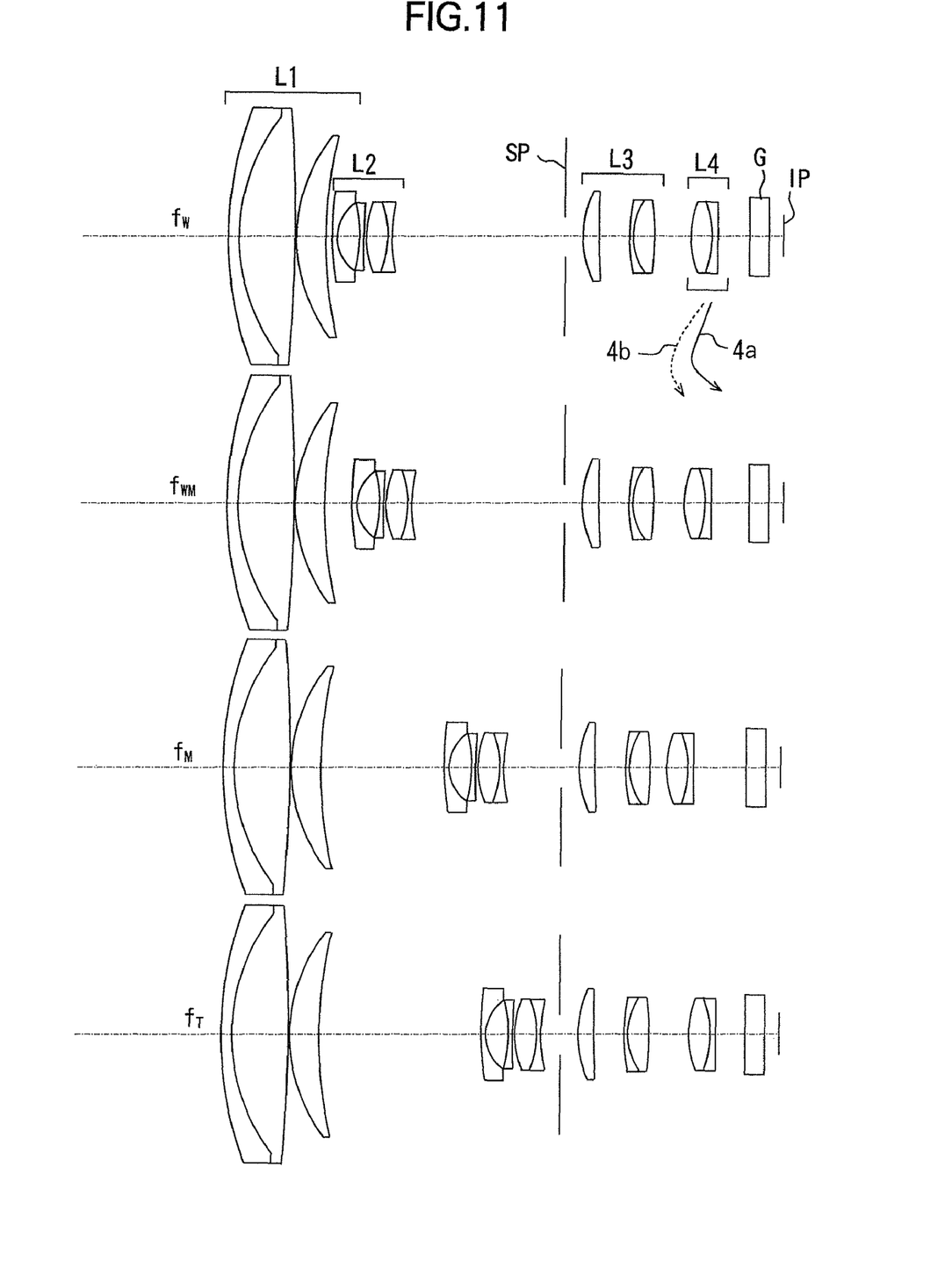
FIG. 11 is a sectional view of an image-taking lens system of the video camera which is a numerical example of the present invention.
Figure 12:
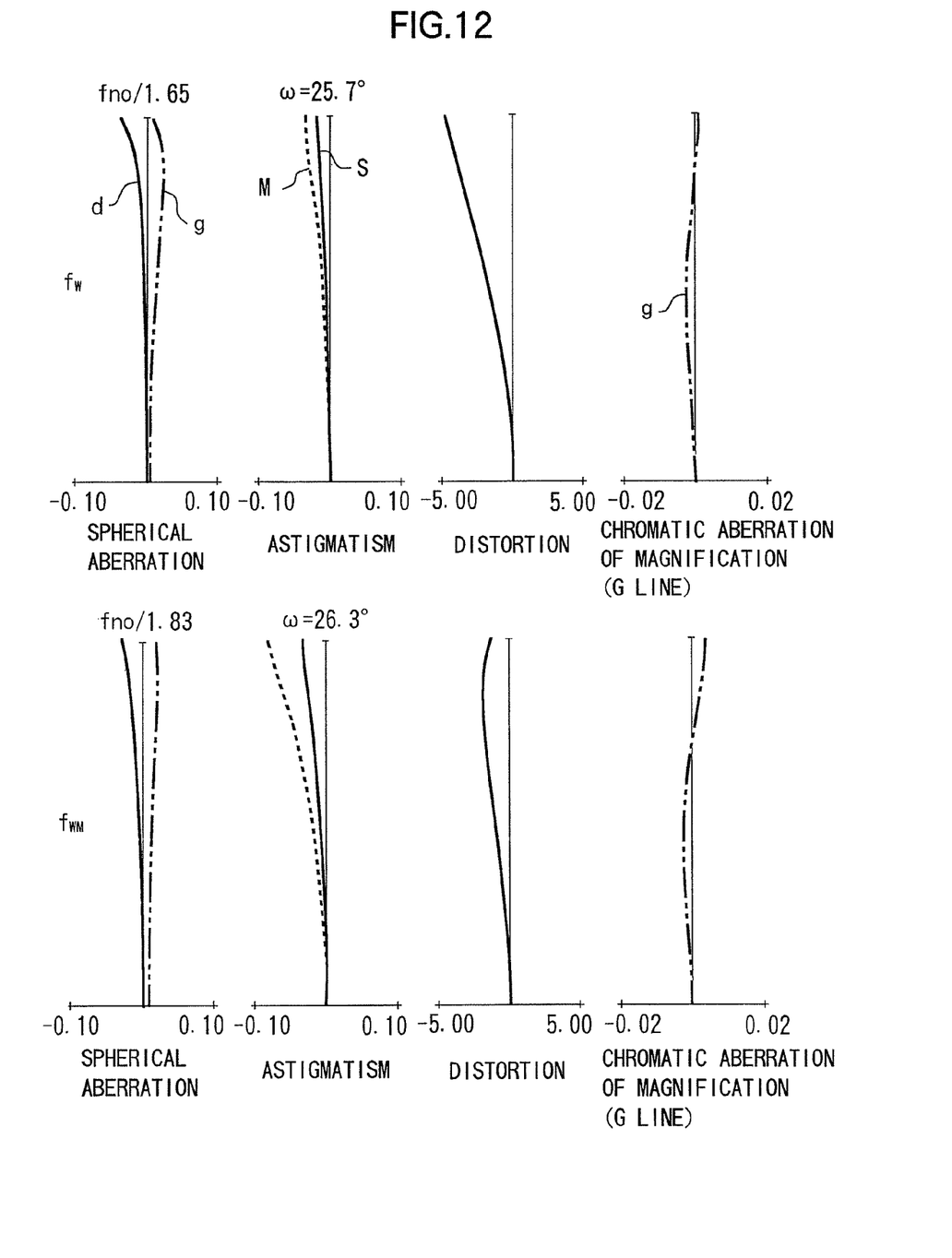
FIG. 12 is an aberration diagram of the image-taking lens system of the numerical example.
Figure 13:
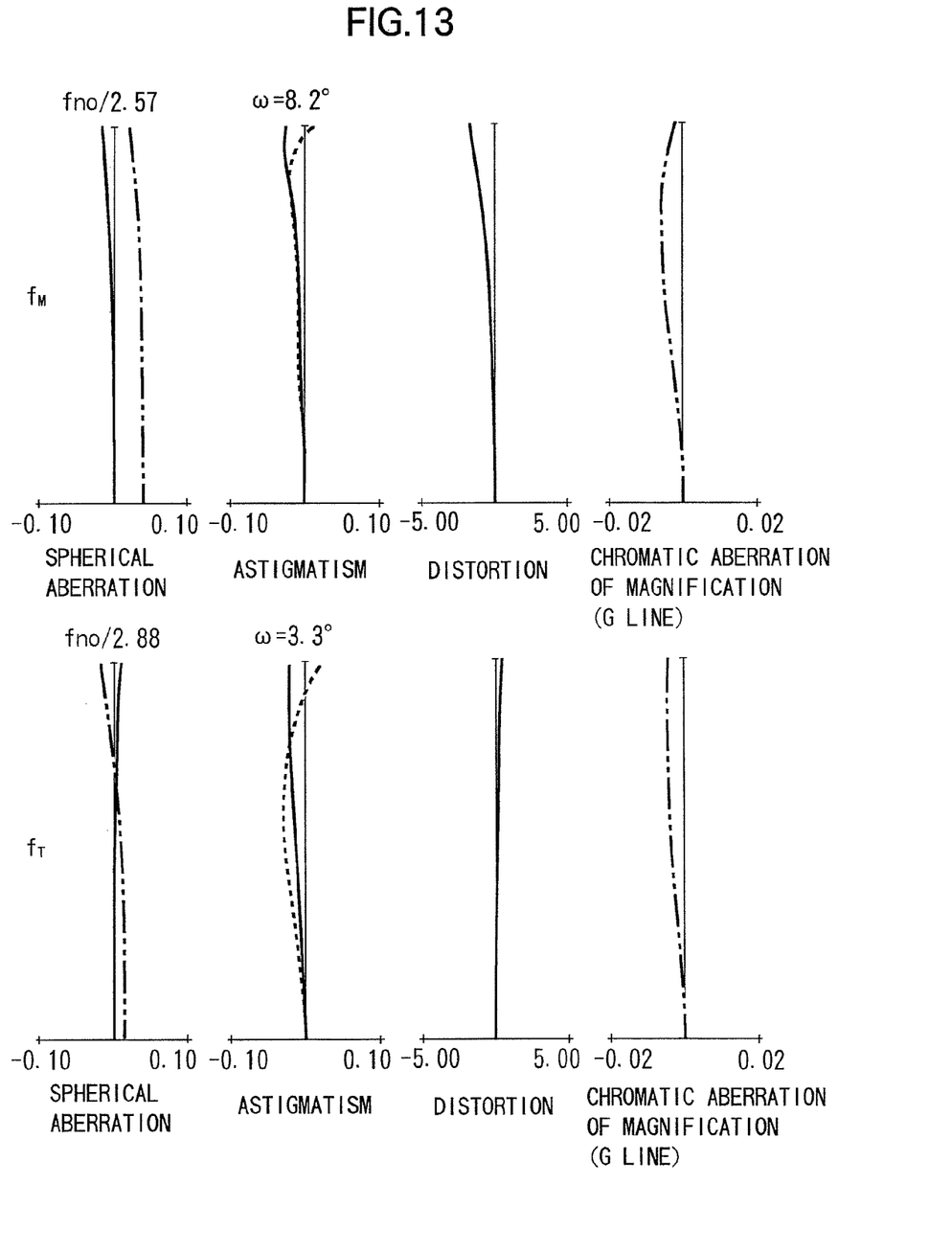
FIG. 13 is an aberration diagram of the image-taking lens system of the numerical example.

Table 1 shows Numerical Example of the image-taking lens system 1 of the camera according to this embodiment. FIGS. 11, 12 and 13 show sectional views and aberration diagram of the image-taking lens system 1 of Numerical Example, respectively. In FIG. 11, reference character $f_W$ denotes a short focal length (wide-angle) end, $f_{WM}$ denotes a position on the wide-angle side, $f_M$ denotes a middle position between the wide-angle end and a long focal length (telephoto) end and $f_T$ denotes the telephoto end. And in FIG. 11, reference character G denotes an optical glass block such as an optical low-pass filter or an infrared cut filter. Reference character IP denotes the image surface (image-pickup surface of the image-pickup element 3).

In FIG. 11, a solid line 4a below the focus lens unit L4 indicates a movement track of the focus lens unit L4 for correcting image surface movement in conjunction with the variation of magnification from the wide-angle end to the telephoto end when focusing on an object at infinity. A dotted line 4b indicates the movement track of the focus lens unit L4 for correcting the image surface movement in conjunction with the variation of magnification from the wide-angle end to the telephoto end when focusing on a short-distance object.

Furthermore, in Table 1, reference character f denotes the focal length of the entire image-taking lens system 1, FNo denotes an F number, ω denotes a half field angle, ri denotes a curvature radius of an i-th optical surface from the object side, di denotes a space between i-th and i+1-th lens surfaces from the object side, and ni and vi denote an refractive index and an Abbe number of the i-th lens from the object side, respectively.

Of the lens surfaces, an aspheric shape is represented by the following expression.

$$x=(h^2/r)/\{1+\{1-(1+K)(h/r)^2\}^{1/2}\}+Bh^4+Ch^6+Dh^8+Eh_{10}$$

Furthermore, e−X represents $\times 10^{-X}$

TABLE 1

| | | | | | | | |
|---|---|---|---|---|---|---|---|
| r1 = | 45.013 | d1 = | 1.40 | n1 = | 1.84666 | v1 = | 23.9 |
| r2 = | 25.393 | d2 = | 6.96 | n2 = | 1.48749 | v2 = | 70.2 |
| r3 = | −174.367 | d3 = | 0.20 | | | | |
| r4 = | 21.396 | d4 = | 3.56 | n3 = | 1.77250 | v3 = | 49.6 |
| r5 = | 56.123 | d5 = | Variable | | | | |
| r6 = | 64.027 | d6 = | 0.60 | n4 = | 1.84666 | v4 = | 23.9 |
| r7 = | 5.291 | d7 = | 2.79 | | | | |

TABLE 1-continued

| | | | | | | | |
|---|---|---|---|---|---|---|---|
| r8 = | −13.988 | d8 = | 0.50 | n5 = | 1.78590 | v5 = | 44.2 |
| r9 = | 170.827 | d9 = | 0.20 | | | | |
| r10 = | 11.943 | d10 = | 2.74 | n6 = | 1.84666 | v6 = | 23.9 |
| r11 = | −11.943 | d11 = | 0.50 | n7 = | 1.60311 | v7 = | 60.6 |
| r12 = | 19.272 | d12 = | Variable | | | | |
| r13 = | ∞ (Aperture) | d13 = | 2.30 | | | | |
| r14 = | 12.722 (Aspheric surface) | d14 = | 1.90 | n8 = | 1.80610 | v8 = | 40.7 |
| r15 = | 99.712 | d15 = | 3.80 | | | | |
| r16 = | 22.930 | d16 = | 0.50 | n9 = | 1.84666 | v9 = | 23.9 |
| r17 = | 7.922 | d17 = | 2.70 | n10 = | 1.48749 | v10 = | 70.2 |
| r18 = | −33.982 | d18 = | Variable | | | | |
| r19 = | 13.375 | d19 = | 2.65 | n11 = | 1.78590 | v11 = | 44.2 |
| r20 = | −13.375 | d20 = | 0.50 | n12 = | 1.84666 | v12 = | 23.9 |
| r21 = | 172.094 | d21 = | Variable | | | | |
| r22 = | ∞ | d22 = | 2.40 | n13 = | 1.51633 | v13 = | 64.1 |
| r23 = | ∞ | | | | | | |

| | $f_W$ | $f_{WM}$ | $f_M$ | $f_T$ |
|---|---|---|---|---|
| \Focal length Variable space\ | 4.32 | 5.35 | 18.46 | 45.85 |
| d5 | 0.85 | 3.73 | 15.27 | 20.08 |
| d12 | 21.58 | 18.70 | 7.16 | 2.35 |
| d18 | 4.58 | 4.03 | 2.19 | 5.92 |
| d21 | 4.25 | 4.81 | 6.64 | 2.91 |

| Aspheric coefficient 14th surface | | | | |
|---|---|---|---|---|
| K | B | C | D | E |
| −7.8623e−01 | −1.7173e−05 | 1.5598e−07 | −3.1767e−09 | 1.4344e−10 | f = 4.32~45.85 FNo = 1:1.65~2.88 2ω = 51.4° ~6.6°

Here, as in this embodiment, the reasons to perform the peripheral light amount adjustment by using the correcting lens unit L3 are that the correcting lens unit L3 originally uses a lens to which a decentration aberration seldom occurs even if moved in the direction orthogonal to the optical axis and that it originally has a movement mechanism in the direction orthogonal to the optical axis for correcting the image blurring and so there is no need to newly add the movement mechanism for the peripheral light amount adjustment.

In the case of the correcting lens unit L3, the value of (1−βi)×βr is approximately 0.9 without noticeable change in the entire zoom area so that it is not necessary to change the movement amount (adjustment data) according to a zoom position. Therefore, it is possible, even if the adjustment data determined for one zoom position is used in the entire zoom area, to improve the unbalance of the peripheral light amounts in the entire zoom area.

It is also possible, however, to change the adjustment data (offset position data) according to the zoom position. In this case, the zoom positions should be sequentially changed at a predetermined interval, and each time the zoom position is changed, the balance of the peripheral light amounts should be evaluated and the offset position data should be stored in the memory 10. And the offset position data on the zoom position of which offset position data was not directly obtained may be acquired by an interpolating calculation based on the offset position data obtained at zoom positions adjacent thereto.

This embodiment described the case of using a zoom-type image-taking lens system. However, the present invention is also applicable to the case of using a single-focal-length image-taking lens system.

Embodiment 2

Next, a description will be given as to a zoom center displacement adjustment method for the video camera which is Embodiment 2 of the present invention. The camera to which this adjustment method is applied is the camera of the same structure as described in Embodiment 1, the same components are given the same symbols and the descriptions thereof will be omitted.

Figure 6:
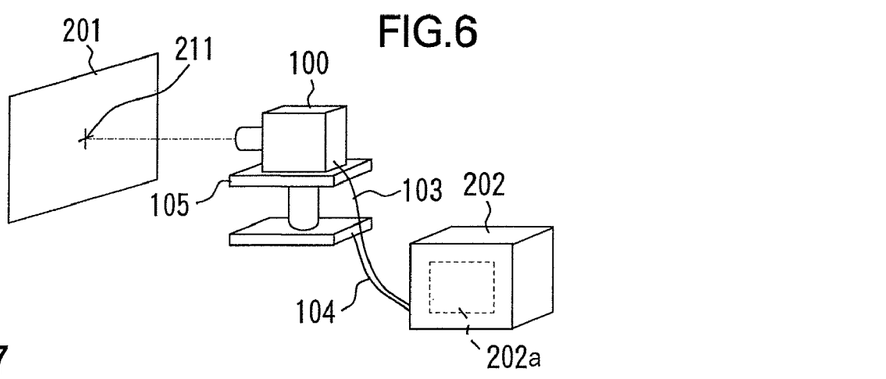
FIG. 6 is a diagram describing the placement of the camera and the adjusting apparatus in Embodiment 2 of the present invention.

In FIG. 6, reference numeral 100 denotes the camera to which a zoom center displacement adjustment is performed, and 201 denotes a chart (object) and a mark 211 is drawn at its center.

The signal input-output section 9 of the camera 100 is connected to an adjusting apparatus 202 via the cable 103. And the adjusting apparatus 202 is also connected to the stage 105 via the cable 104.

Figure 7:
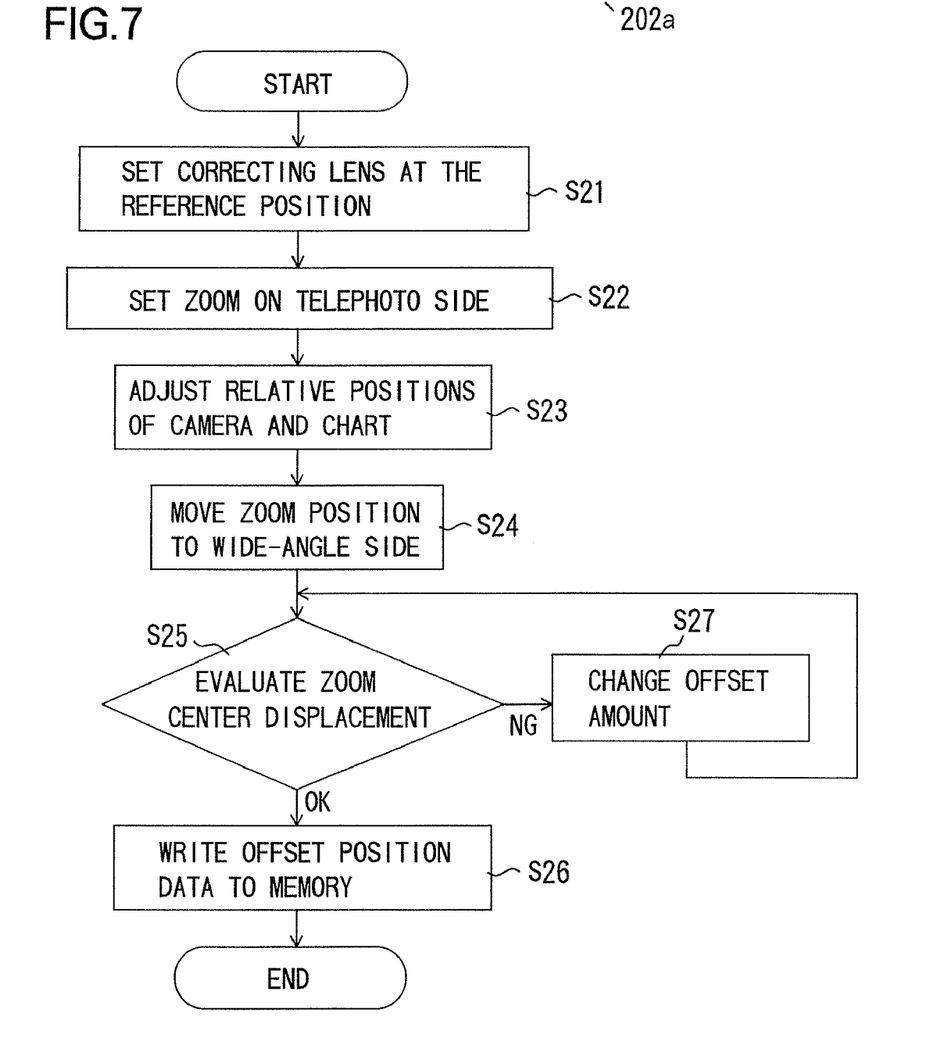
FIG. 7 is a flowchart showing the peripheral light amount adjustment control by the adjusting apparatus in Embodiment 2.

Next, an overview of the zoom center displacement adjustment method will be described according to the flowchart in FIG. 7. This flowchart is executed by a controller in the adjusting apparatus 202 (a CPU or the like: hereafter, referred to as an adjusting controller 202a).

First, in Step (abbreviated as S in the drawing) 21, the adjusting controller 202a sends to the camera control circuit 4 a command to set the correcting lens unit L3 to a reference position at the center (on the optical axis of the image-taking lens system 1) or the vicinity of the center (in a range with no substantial change of the image position on the image surface) of the range of movement for correcting the image blurring. The camera control circuit 4 sets the correcting lens unit L3 to the reference position via the image stabilizer drive circuit 7 according to the command.

Next, in Step 22, the adjusting controller 202a sends to the camera control circuit 4 a command to set the zoom position to a predetermined zoom position on the telephoto side (the telephoto end, for instance). The camera control circuit 4 sets the variator lens unit L2 to the predetermined zoom position via the zoom drive circuit 5 according to the command.

In Step 23, the adjusting controller 202a controls the stage 105 to adjust the position of the camera 100 against the chart 201 so that the image of the mark 211 drawn at the center of the chart 201 comes to the center on the image-pickup element 3. In this case, the image-taking lens system 1 focuses on the mark 211 by the auto focus control.

Next, in Step 24, the adjusting controller 202a sends to the camera control circuit 4 a command to set the zoom position to a predetermined zoom position on the wide-angle side (the wide-angle end, for instance). The camera control circuit 4 moves the variator lens unit L2 to the predetermined zoom position on the short focal length side via the zoom drive circuit 5 according to the command. In this case, the image-taking lens system 1 maintains the focus on the mark 211 by the auto focus control.

And in Step 25, the adjusting controller 202a takes in the output signal from the image-pickup element 3 via the camera control circuit 4 so as to perform zoom center displacement evaluation (described in detail later) on changing the zoom position from the telephoto side to the wide-angle side. And the process proceeds to Step 26 if determined that the amount of the zoom center displacement is in a predetermined range and is good, and proceeds to Step 27 if determined that the balance is out of the predetermined range and is no good.

In Step 27, the adjusting controller 202a sends to the camera control circuit 4 a command to move the correcting lens unit L3 in the direction to improve the displacement evaluation (to reduce the displacement amount) by a predetermined offset amount based on the result of the zoom center displacement evaluation. On receiving this command, the camera control circuit 4 moves the correcting lens unit L3 in the direction designated by the command by the predetermined offset amount via the image stabilizer drive circuit 7.

Thus, Step 27 is repeatedly executed until the zoom center displacement evaluation is determined to be good in Step 25. If the zoom center displacement evaluation is determined to be good in Step 25, the adjusting controller 202a sends to the camera control circuit 4 a command to store the offset position data (adjustment data indicating the total offset amount, that is, the movement amount from the reference position) of the correcting lens unit L3 in the direction orthogonal to the optical axis in Step 26. On receiving this command, the camera control circuit 4 detects the position of the correcting lens unit L3 against the reference position, that is, the offset position data at the time based on the output from the shift position sensor 15 so as to write it to the memory 10. And the process according to this flowchart is finished.

Here, the zoom center displacement evaluation will be described by using FIG. 8. Reference numeral 211T denotes an image of the mark 211 formed at the center on the image-pickup element 3 when the zoom position is on the telephoto side in Step 23 in FIG. 7. Reference numeral 211W denotes an image of the mark 211 when the zoom position is on the wide-angle side in the case of the zoom center displacement exceeding the predetermined range. The zoom center displacement evaluation in this embodiment evaluates whether or not the distance between the images 211T and 211W on the image-pickup element 3 exceeds the predetermined range. To be more specific, an image signal of the image 211T and that of the image 211W on the image-pickup element 3 are taken in by the adjusting controller 202a, and the image signals thereof are compared so as to detect the distance between the image 211T and the image 211W on the image-pickup element 3. And in the case where the distance between the image 211T and the image 211W is in the predetermined range capable of substantially regarding it as 0 on the adjusting controller 202a, the zoom center displacement evaluation is determined to be good. If out of the predetermined range, the zoom center displacement evaluation is determined to be no good.

In the case where the zoom center displacement evaluation is determined to be no good, the following is approximately the amount by which the correcting lens unit L3 should be moved in the direction orthogonal to the optical axis in order to make it good, when a paraxial lateral magnification of the correcting lens unit L3 is $\beta i$, the paraxial lateral magnification of the lens system (the focus lens unit L4 in this embodiment) placed further on the image surface side than the correcting lens unit L3 is $\beta r$, and the amount of displacement of the center of the image-pickup element 3 against the optical axis of the image-taking lens system 1 is D at the time.

$$D/\{(1-\beta i) \times \beta r\}$$

On adjusting the zoom center displacement in this embodiment, the true value of the amount of displacement D is not known. Therefore, the correcting lens unit L3 is moved, by the amount (predetermined amount) obtained by assigning the value of D which increases step by step to an expected maximum amount of displacement to the expression, in the direction in which the distance becomes shorter (Step 27 in FIG. 7) so as to finally implement a state capable of obtaining a good zoom center displacement evaluation.

According to this embodiment, the position of the correcting lens unit L3 in the case where the zoom center displacement evaluation is determined to be good is detected by the shift position sensor 15 and is stored in the memory 10. It is also possible, however, to add and store the total offset amount from the reference position of the correcting lens unit L3 in the adjusting controller 202a or the camera control circuit 4, and then store it in the memory 10.

Figure 8:
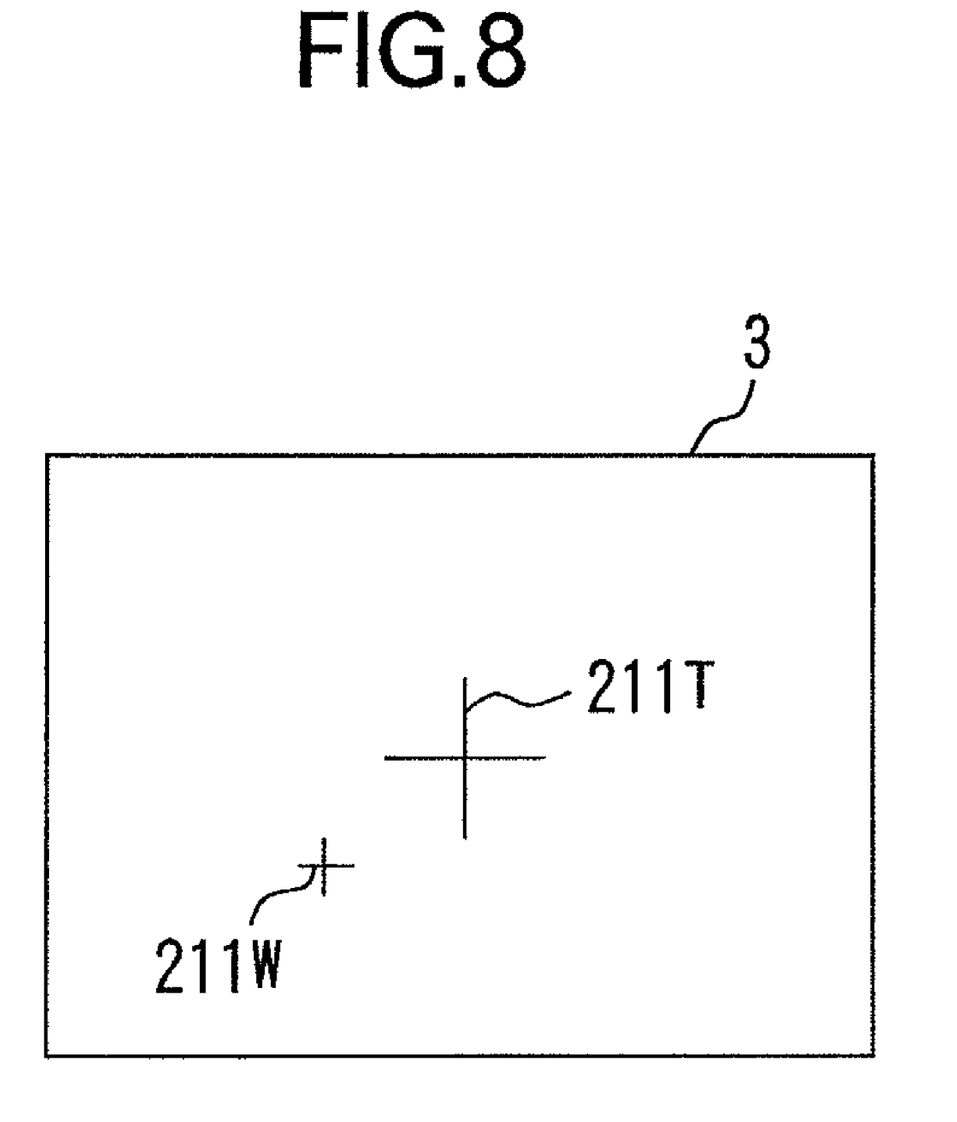
FIG. 8 is a diagram describing a displacement from a zoom center.

As for the image-taking lens system 1 indicated in the above-mentioned numerical example, when the image-pickup element 3 is diagonally displaced from the optical axis of the image-taking lens system 1 by 0.1 mm, the zoom center displacement can be mostly eliminated by shifting the correcting lens unit L3 in the direction orthogonal to the optical axis by 0.11 mm so that the images 211T and 211W of the mark 211 shown in FIG. 8 will overlap.

Here, as in this embodiment, the reasons to perform the zoom center displacement adjustment by using the correcting lens unit L3 are, as with Embodiment 1, that the correcting lens unit L3 originally uses the lens to which a decentration aberration seldom occurs even if moved in the direction orthogonal to the optical axis and that it originally has the movement mechanism in the direction orthogonal to the optical axis for correcting the image blurring and so there is no need to newly add the movement mechanism for the zoom center displacement adjustment.

In the case of the correcting lens unit L3, the value of $(1-\beta i) \times \beta r$ is approximately 0.9 without noticeable change in the entire zoom area so that it is not necessary to change the movement amount (adjustment data) according to the zoom position.

It is also possible, however, to change the adjustment data according to the zoom position. In this case, instead of the movement of the zoom position to the wide-angle side performed in Step 24 in FIG. 7, the zoom positions should be sequentially changed at a predetermined zoom position interval, and each time the zoom position is changed, the zoom center displacement should be evaluated and the offset position data should be stored in the memory 10. And the offset position data on the zoom position of which offset position data was not directly obtained may be acquired by an interpolating calculation based on the offset position data obtained at zoom positions adjacent thereto.

The embodiments described the cases of moving the correcting lens unit L3 in the direction orthogonal to the optical axis for the peripheral light amount adjustment and the zoom center displacement adjustment. It is also possible, however, to move a lens unit other than the correcting lens unit L3 in the direction orthogonal to the optical axis. In this case, it is also possible to fix the position of the lens unit other than the correcting lens unit L3 in the direction orthogonal to the optical axis on a lens body by adhesion so as to prevent the position thereof from changing after the adjustment.

The image-taking lens system described in the embodiments should satisfy the following condition.

$$0.1 < |(1-\beta i) \times \beta r| < 10.0 \tag{1}$$

Conditional Expression (1) relates to image displacement sensitivity of the correcting lens unit L3 (or an offset lens unit moving in the direction orthogonal to the optical axis). If this value is lower than the lower limit of the expression (1), the sensitivity becomes too low so that the offset amount for the adjustment becomes large. For this reason, a diameter of the correcting lens unit L3 becomes larger, which is not desirable. Preferably, the lower limit should be 0.2. More preferably, the lower limit should be 0.4.

If this value exceeds the upper limit of the expression (1), the sensitivity becomes so high that adjustment accuracy of the offset amount for the adjustment becomes strict and so very accurate control is required, which is not desirable. Preferably, it should not exceed 5.0. More preferably, it should not exceed 2.5.

Furthermore, it should be βr=1 in the expression (1) in the case of using the image-taking lens system having no lens system further on the image surface side than the correcting lens unit L3.

It should further satisfy the following condition in Embodiment 2.

$$0.3 < \{(1-\beta iw) \times \beta rw\}/\{(1-\beta it) \times \beta rt\} < 3.0 \quad (2)$$

Here, βiw and βrw are the above βi and βr at the wide-angle end, and βit and βrt are the above βi and βr at the telephoto end.

Conditional Expression (2) relates to a ratio of the image displacement sensitivity of the correcting lens unit L3 (or an offset lens unit moving in the direction orthogonal to the optical axis) at the wide-angle end and the telephoto end. If the value of this ratio is approximately 1.0, the offset amounts at the wide-angle end and the telephoto end can be the same value. If the value of the ratio is away from 1.0 by exceeding the lower limit or the upper limit of the ratio, since the offset amounts for optical adjustment must be significantly changed at the wide-angle end and the telephoto end, the adjustment and control become complicated, which is not desirable. More preferably, the lower limit should be 0.7 and the upper limit should be 1.5.

When the correcting lens unit L3 is the offset lens unit in the image-taking lens system in the numerical example, the value of the Conditional Expression (1) is 0.91 when f=5.35 mm, and the value of the Conditional Expression (2) is 0.99. To be more specific, both the conditional expressions are satisfied.

The embodiments described the cases of adjusting the unbalance of the peripheral light amounts and the zoom center displacement caused by the displacement of the center of the image-pickup element against the optical axis of the image-taking lens system. However, the unbalance of the peripheral light amounts and the zoom center displacement are also caused by an axial displacement of the lens in the image-taking lens system and a light-shielding member even if there is no positional displacement of the image-pickup element described above. Therefore, it is also possible to adjust the unbalance of the peripheral light amounts and the zoom center displacement due to these factors.

In the case of image-taking with the camera thus optically adjusted, the offset position data written to the memory 10 is read by the camera control circuit 4. The camera control circuit 4 provides an offset to the reference position which is a reference of the correcting movement of the correcting lens unit L3 via the image stabilizer drive circuit 7 according to the offset position data. In the following Embodiments 3 and 4, a concrete control flowchart for the video camera will be described.

Embodiment 3

Figure 9:
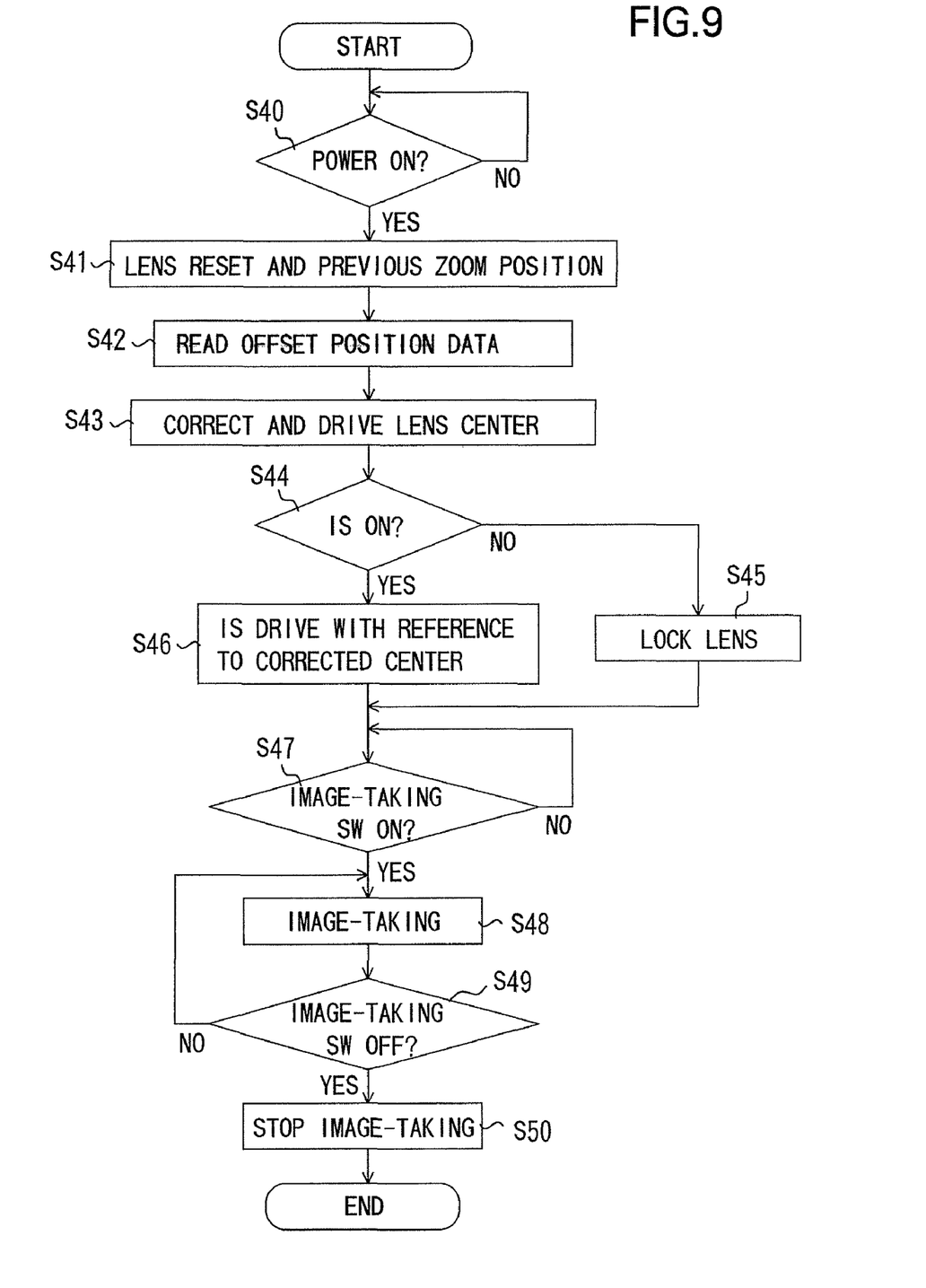
FIG. 9 is a flowchart showing an operation of the video camera which is Embodiment 3 of the present invention.

FIG. 9 shows a control flowchart of the video camera which performs the peripheral light amount adjustment and the zoom center displacement adjustment with a piece of the offset position data in the entire zoom area. This flowchart is mainly executed by the camera control circuit 4.

First, if the power of the video camera is turned on in Step (abbreviated as S in the drawing) 40, the camera control circuit 4 resets (moves to the reference position for position detection) each lens unit via each drive circuit in Step 41. After this reset operation, the camera control circuit 4 moves the variator lens unit L2 to a zoom position stored in the memory not shown when the power was turned off last time.

Next, in Step 42, the camera control circuit 4 reads the offset position data stored in the memory 10. And in Step 43, the camera control circuit 4 changes the reference position which is the center of the movement range for correcting the image blurring of the correcting lens unit L3 from the optical axis of the image-taking lens system 1 by the distance equivalent to the offset amount represented by the offset position data so as to make it as a new reference position (to be more specific, it corrects the center position of the deflection correcting lens unit L3).

Next, in Step 44, it determines whether or not the IS switch 19 shown in FIG. 1 is on. In the case where the IS switch 19 is off, the process proceeds to Step 45, and the camera control circuit 4 locks the correcting lens unit L3 at the reference position corrected (changed) in Step 43. To prevent the correcting lens unit L3 from moving due to a vibration when in use, this locking is performed by electrically keeping the correcting lens unit L3 at the corrected reference position with the actuator of the image stabilizer drive circuit 7.

In the chase where the IS switch 19 is on, the process proceeds to Step 46, and the camera control circuit 4 calculates the direction and the amount to drive the correcting lens unit L3 based on the signal from the vibration sensor 18. And the camera control circuit 4 controls an image blurring correcting movement of the correcting lens unit L3 in the drive direction and by the drive amount obtained by this calculation with reference to (centering on) the reference position corrected in Step 43.

Next, in Step 47 after Step 45 or Step 46, the camera control circuit 4 determines whether or not the image-taking switch 20 shown in FIG. 1 is on. If the image-taking switch 20 is on, the process proceeds to Step 48, and the camera control circuit 4 starts video shooting (image-taking).

Next, in Step 49, the camera control circuit 4 determines whether or not the image-taking switch 20 is off. If the image-taking switch 20 is not off, the process returns to Step 48, and the camera control circuit 4 continues the video shooting. If the image-taking switch 20 is off, the process proceeds to Step 50, and the camera control circuit 4 stops the video shooting. And the process according to this flowchart is finished.

Embodiment 4

Figure 10:
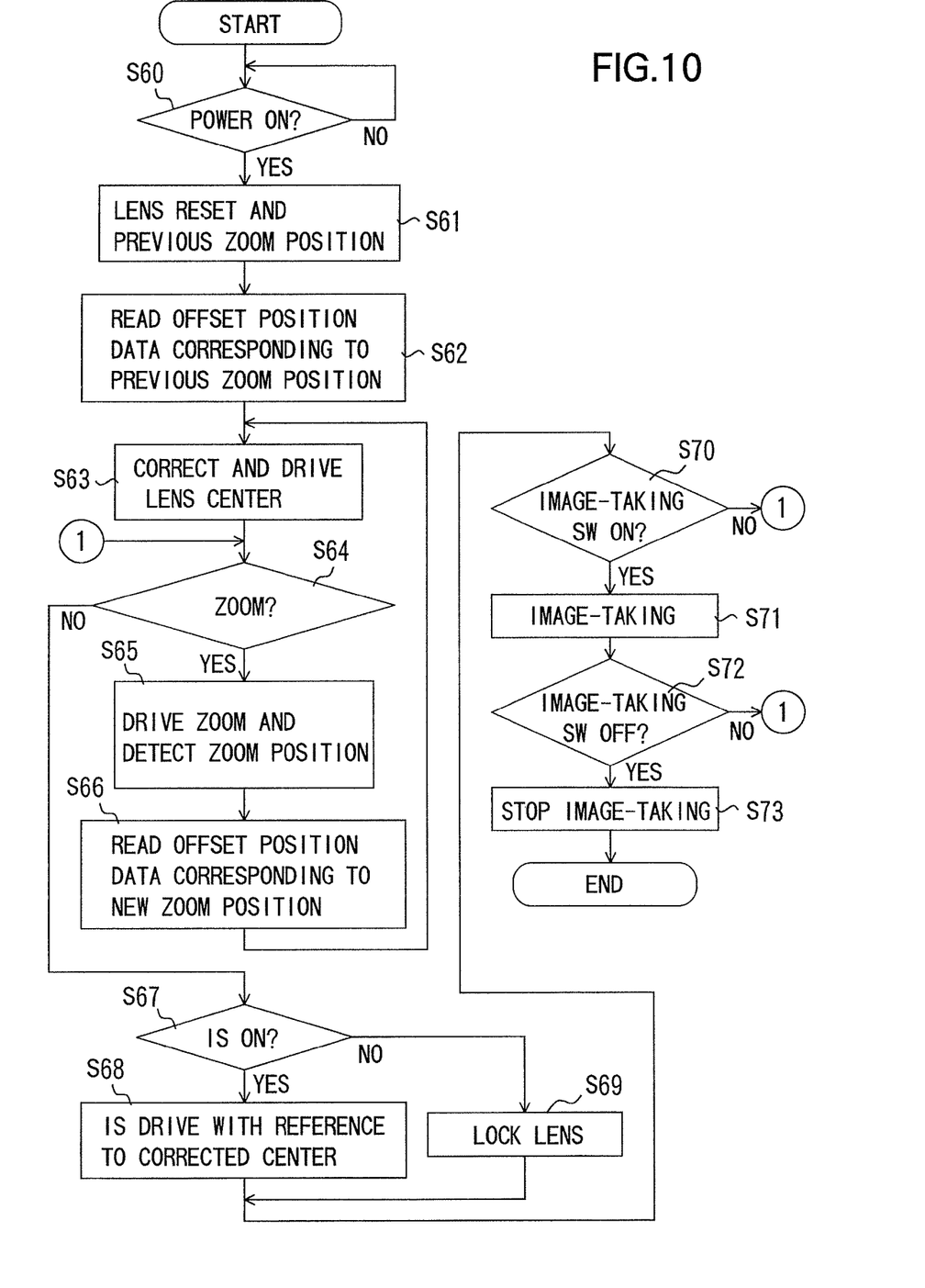
FIG. 10 is a flowchart showing the operation of the video camera which is Embodiment 4 of the present invention.

FIG. 10 shows a control flowchart of the video camera which performs the peripheral light amount adjustment and the zoom center displacement adjustment by using the offset position data according to the zoom position. This flowchart is mainly executed by the camera control circuit 4.

First, if the power of the video camera is turned on in Step (abbreviated as S in the drawing) 60, the camera control circuit 4 resets (moves to the reference position for the position detection) each lens unit via each drive circuit in Step 61. After this reset operation, the camera control circuit 4 moves the variator lens unit L2 to a zoom position stored in the memory not shown when the power was turned off last time.

Next, in Step 62, of the offset position data according to the zoom position stored in the memory 10, the camera control circuit 4 reads the offset position data according to a current (that is, last power-off) zoom position.

And in Step 63, the camera control circuit 4 changes the reference position which is the center of the movement range for correcting the image blurring of the correcting lens unit L3 from the optical axis of the image-taking lens system 1 by the distance equivalent to the offset amount represented by the offset position data so as to make it as a new reference position (to be more specific, it corrects the center position of the correcting lens unit L3).

Next, in Step 64, the camera control circuit 4 determines whether or not the zoom switch 13 shown in FIG. 1 is operated. In the case where the zoom switch 13 is operated on the wide-angle side or the telephoto side, the process proceeds to Step 65, and the camera control circuit 4 drives the variator lens unit L2 via the zoom drive circuit 5 in the direction corresponding to the operated side. At this time, the camera control circuit 4 detects the changed zoom position through the zoom position sensor 16.

And in Step 66, the camera control circuit 4 reads the offset position data according to the changed zoom position from the memory 10, and then the process returns to Step 63 to change (correct) the reference position of the correcting lens unit L3 again.

If determined that the zoom switch 13 is not operated in Step 64, the process proceeds to Step 67, and the camera control circuit 4 determines whether or not the IS switch 19 shown in FIG. 1 is on. In the case where the IS switch 19 is off, the process proceeds to Step 69, and the camera control circuit 4 locks the correcting lens unit L3 at the reference position corrected (changed) in Step 43. To prevent the correcting lens unit L3 from moving due to a vibration when in use, this locking is performed by electrically keeping the correcting lens unit L3 at the corrected reference position with the actuator of the image stabilizer drive circuit 7.

In the chase where the IS switch 19 is on, the process proceeds to Step 68, and the camera control circuit 4 calculates the direction and the amount to drive the correcting lens unit L3 based on the signal from the vibration sensor 18. And the camera control circuit 4 drives the correcting lens unit L3 in the drive direction and by the drive amount obtained by this calculation with reference to (centering on) the reference position corrected in Step 63.

Next, in Step 70 after Step 68 or Step 69, the camera control circuit 4 determines whether or not the image-taking switch 20 shown in FIG. 1 is on. If the image-taking switch 20 is on, the process proceeds to Step 71, and the camera control circuit 4 starts the video shooting. If the image-taking switch 20 is not on, the process returns to Step 64.

Next, in Step 72, the camera control circuit 4 determines whether or not the image-taking switch 20 is off. If the image-taking switch 20 is not off, the process returns to Step 64, and the camera control circuit 4 continues the video shooting while checking whether or not the zoom switch 13 is operated. If the image-taking switch 20 is off, the process proceeds to Step 73, and the camera control circuit 4 stops the video shooting. And the process according to this flowchart is finished.

The above embodiments described the video camera. However, the present invention is also applicable to a digital still camera.

As described above, according to the embodiments, it is possible to move the offset lens unit after fixing the image-pickup element on the image-taking optical system so as to correct the unbalance of the peripheral light amounts and the zoom center displacement on the image-pickup element.

It is also possible, by having the adjustment data stored in the memory, to read the adjustment data from the memory and adjust and drive the offset lens unit on image-taking so as to easily reproduce a good state in which the unbalance of the peripheral light amounts and the zoom center displacement are corrected by the adjustment.

Furthermore, it is also possible, by adopting a lens unit for correction of the image blurring as the offset lens unit, to correct the unbalance of the peripheral light amounts and the zoom center displacement by using driving means for correction of the image blurring so as to prevent the image-taking apparatus from becoming large-size.

While preferred embodiments have been described, it is to be understood that modification and variation of the present invention may be made without departing from scope of the following claims.

What is claimed is:

1. An image-taking apparatus comprising:
   an image-taking optical system which includes an offset lens unit being movable in a direction orthogonal to an optical axis of the image-taking optical system, the image-taking optical system being capable of variation of magnification;
   an image-pickup element which photoelectrically converts an image of an object formed by the image-taking optical system; and
   a memory which stores adjustment data,
   wherein the adjustment data is data on a movement amount of the offset lens unit to prevent substantially an object point image-formed at a center on the image-pickup element by the image-taking optical system from moving in a direction orthogonal to the optical axis during the variation of magnification,
   wherein the image-taking apparatus satisfies the following condition:

$$0.1 < |(1-\beta i) \times \beta r| < 10.0$$

where $\beta i$ represents a paraxial lateral magnification of the offset lens unit, $\beta r$ represents a paraxial lateral magnification of the lens system placed further on an image surface side than the offset lens unit of the image-taking optical system, and the $\beta r$ is equal to 1 in a case of not having the lens system.

2. The image-taking apparatus according to claim 1, wherein the adjustment data is data on a movement amount of the offset lens from a predetermined reference position set on the optical axis.

3. The image-taking apparatus according to claim 1, further comprising:
   an actuator which drives the offset lens unit; and
   a controller which controls the actuator based on the adjustment data read from the memory.

4. The image-taking apparatus according to claim 3, wherein the offset lens unit moves to correct an image blurring on the image-pickup element, which occurs with a shake of the image-taking apparatus; and
   the controller controls the actuator based on a signal indicating the shake of the image-taking apparatus so that the offset lens unit is driven with reference to a position to which the offset lens unit has moved from a predetermined reference position by the movement amount corresponding to the adjustment data.

5. The image-taking apparatus according to claim 1 further satisfying the following condition:

$$0.3 < \{(1-\beta iw) \times \beta rw\} / \{(1-\beta it) \times \beta rt\} < 3.0$$

where $\beta iw$ and $\beta rw$ represent the $\beta i$ and $\beta r$ at a wide-angle end, and $\beta it$ and $\beta rt$ represent the $\beta i$ and $\beta r$ at a telephoto end, respectively.

* * * * *